Sept. 20, 1960 T. W. HALLERBERG 2,953,063
PARACHUTE ACTUATOR
Filed April 7, 1958 2 Sheets-Sheet 1
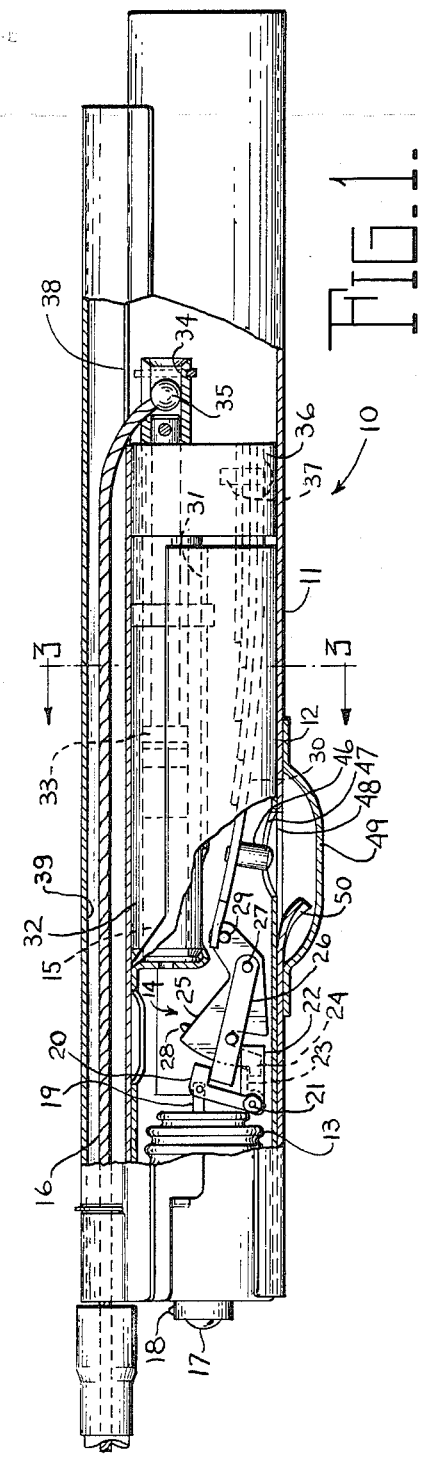
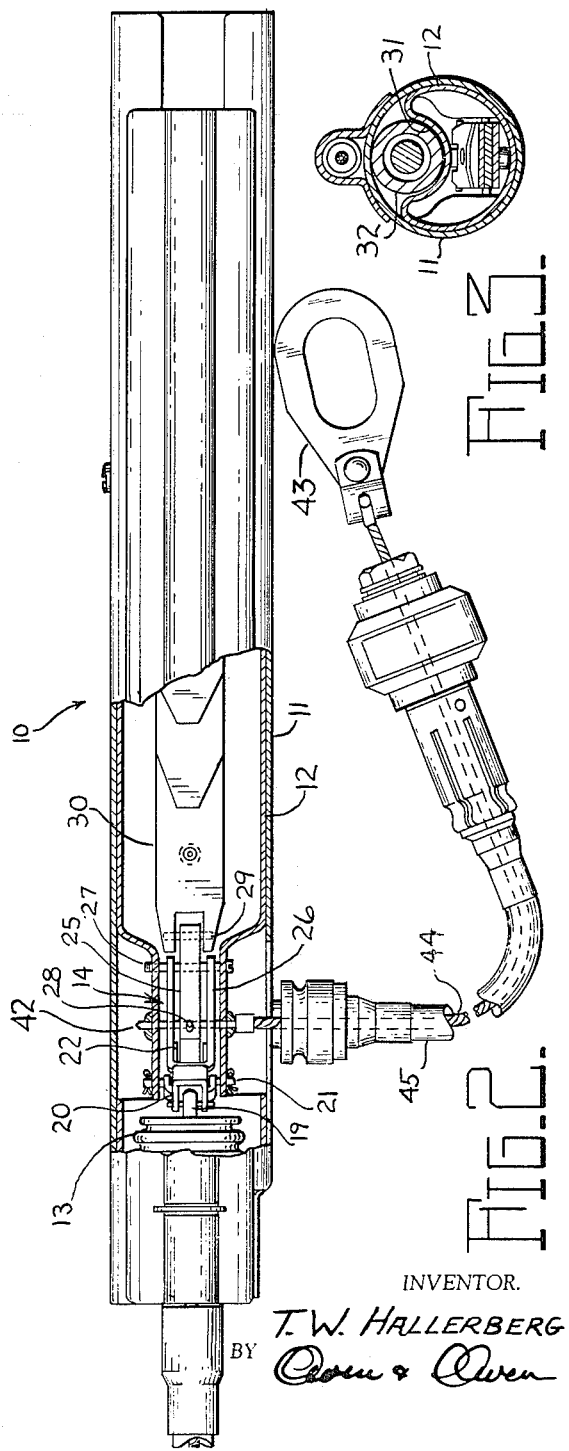
INVENTOR.
T. W. HALLERBERG
BY Sept. 20, 1960 T. W. HALLERBERG 2,953,063
PARACHUTE ACTUATOR
Filed April 7, 1958 2 Sheets-Sheet 2
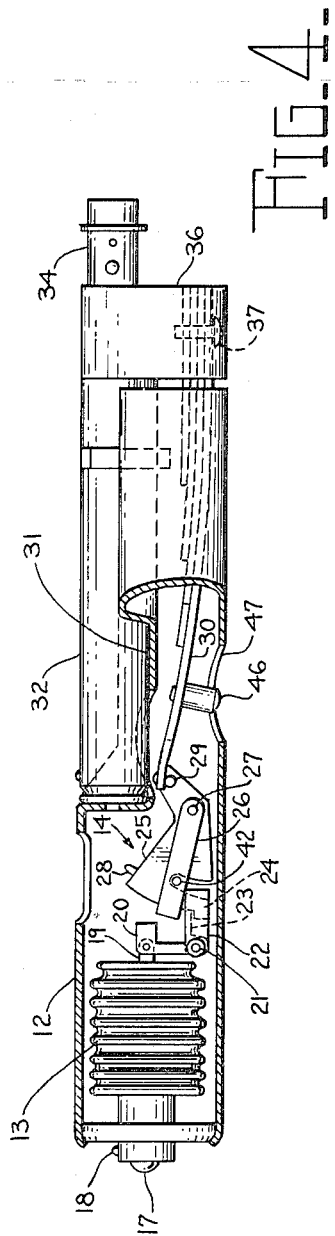
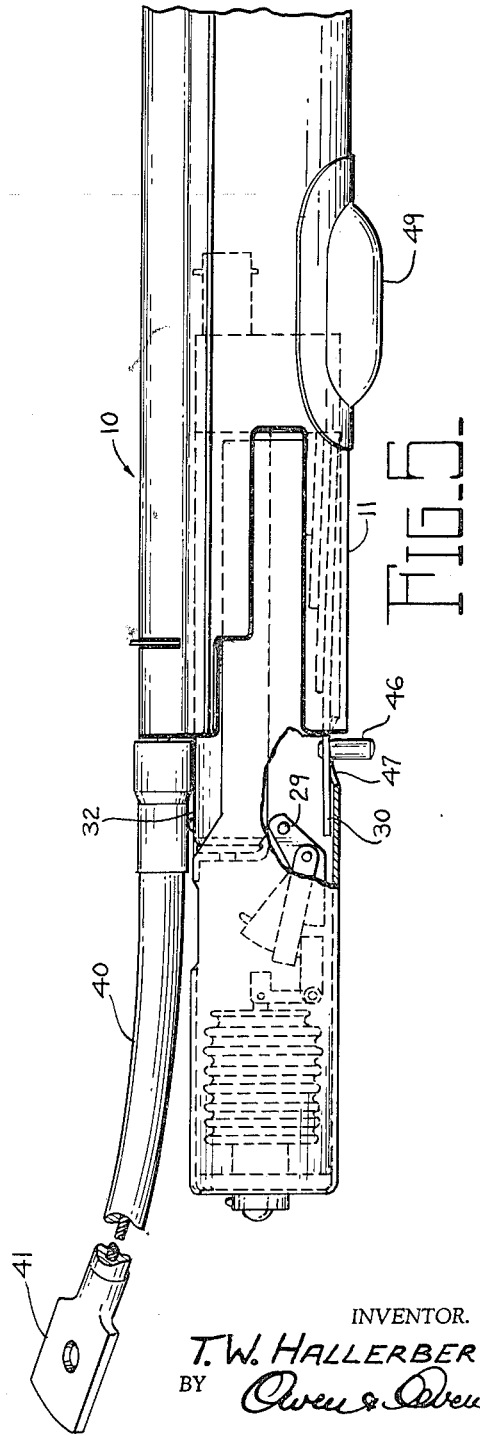
INVENTOR.
T. W. HALLERBERG
BY Owen & Owen

United States Patent Office 2,953,063
Patented Sept. 20, 1960

2,953,063

PARACHUTE ACTUATOR

Theodore W. Hallerberg, 956 E. 108th St.,
Los Angeles, Calif.

Filed Apr. 7, 1958, Ser. No. 726,691

3 Claims. (Cl. 89—1)

This invention pertains to parachute actuators and more particularly to such an actuator having means for assuring proper assembly thereof.

Parachute actuators are used to cause a parachute to open automatically at predetermined altitudes. Such devices are particularly important for use with modern jet aircraft which are normally flown at very high altitudes. If a pilot must quickly evacuate such an aircraft at a high altitude, it is necessary that he be able to fall freely and, therefore, quickly to lower altitudes where more oxygen and higher temperatures prevail. Otherwise, if the parachute is allowed to open at a high altitude, the pilot's rate of descent is considerably decreased and he may perish due to lack of sufficient oxygen and, possibly, exposure to cold, before a warmer altitude, containing enough oxygen to sustain life, is reached. For this reason, such actuators are generally set to open a parachute at about 10,000 feet because at this level there is sufficient oxygen to sustain human life.

When a pilot is ejected from a jet aircraft, he is frequently rendered unconscious by the shock of encountering the relatively stationary, adjacent air. Therefore, the actuator must be as nearly 100% reliable as humanly possible, because a failure means death to the unconscious pilot.

One previously known actuator includes a cartridge that, when fired, pulls a rip cord connected to the parachute. In such an actuator, the cartridge is fired by a firing pin held by a hammer that is restrained from movement by means of a sear attached to a free end of an aneroid cell. When atmospheric pressure increases, as the pilot falls closer to earth, the aneroid cell contracts until the sear is pulled free of the hammer which then swings sharply upwardly and fires the cartridge. The hammer is powered by a stressed leaf spring having a free end in contact with an end of the hammer. When the actuator is assembled, the spring must be in proper position with respect to the hammer so as to exert force thereon or it will be inoperative and not fire the cartridge under any conditions. The C.A.A. requires that all parachutes be inspected and repacked every 60 days. If the parachute actuators are also then disassembled, inspected, and reassembled, the chance of improper assembly is greatly increased.

The present invention proposes an improved parachute actuator of the type described which can only be assembled when the leaf spring is in proper position. To accomplish this, the leaf spring is provided with a projection that protrudes from an inner housing and prevents assembly of an outer housing unless the spring is properly positioned with respect to the firing hammer, at which time the projection is moved out of the way of the outer housing. Thus, the spring cannot be improperly positioned, because in such case, the actuator housing cannot be assembled.

It is, therefore, a principal object of the invention to provide a more reliable parachute actuator.

Another object of the invention is to provide an actuator having means for assuring proper assembly of firing mechanism contained therein.

A further object of the invention is to provide a parachute actuator in which a spring that powers firing mechanism therein is in proper relationship with respect to a hammer of the mechanism when the actuator is assembled.

Other objects of the invention will be suggested from the following detailed description of a preferred embodiment thereof, reference being made to the accompanying drawing, in which:

Fig. 1 is a side view with parts broken away of a parachute actuator embodying the principles of the invention, Fig. 2 is a top view with parts broken away of the parachute actuator shown in Fig. 1, Fig. 3 is a view in cross section taken on line 3—3 of Fig. 1, Fig. 4 is a fragmentary side view of the parachute actuator shown in Figs. 1–3, when subjected to sea-level air pressure, and Fig. 5 is another fragmentary side view of the parachute actuator with a spring thereof improperly assembled and with an outer housing partially assembled with respect to an inner housing.

Conventional portions of a parachute actuator and the operation thereof will now be described with particular reference to Figs. 1–3. A parachute actuator 10 includes an outer housing 11, an inner housing 12, an aneroid cell 13, a firing mechanism generally indicated at 14, a cartridge 15, and a rip cord 16. The aneroid cell 13, partially evacuated, is compressed when the ambient atmospheric pressure increases and is extended outwardly when the atmospheric pressure decreases. The cell is fixed at the left end but can be adjusted with respect to this end by means of an adjusting screw 17 and a set screw 18. The right end of the cell 14 has a centrally located knob 19 that moves longitudinally with the cell 13. The knob 19 is pivotally attached to an upper portion of a sear 20 that pivots about an axis 21. A latch 22 is also pivoted on the axis 21 and has a lip 23 that extends over a lug 24 of a hammer 25 and prevents the hammer 25 from firing when the latch 22 is in a horizontal position. The latch is maintained in such position by means of a lock 26 that is maintained in a cocked position by the sear 21, when in a forward location as determined by the aneroid cell 13. The lock 26 and the hammer 25 pivot about an axis 27; the hammer 25 has a firing pin 28 and a spring pin 29 at its outer end that is engaged by a leaf spring 30.

An upper portion of the inner housing 12 is formed into a trough 31 to receive a barrel 32 that holds the cartridge 15 and a piston 33 which is connected to a socket 34 that holds a ball 35 of the rip cord 16. The barrel 32 is affixed to a solid metal cylindrical member 36 to which the leaf spring 30 is also attached by a screw 37. The cylinder 36, the leaf spring 30, and the barrel 32 constitute a unit that is separable from the inner housing 12 and its components.

The rip cord 16 passes through a slot 38 in the housing 12, through a passage 39 formed by a portion of the housing 12, and through a flexible tube 40 to a ring 41 (Fig. 5). The ring 41 is attached in a known manner to a parachute pack and trips open the pack when pulled by the rip cord 16.

Referring particularly to Fig. 2, an arming pin 42 extends through the outer and inner housings 11 and 12 and passes through a slot in the hammer 25 and a hole in the lock 26 to prevent them from moving when the sear 20 is disengaged from the lock 26. The pin 42 is connected to a ring 43 through a cable 44 protected by a flexible tube 45. The ring 43 is attached to the seat of the aircraft so that when a pilot ejects himself, the ring 43, the cable 44, and the arming pin 42 remain in the aircraft, thus leaving the hammer 25 and the firing pin 28 free to move when the lock 26 is disengaged from the sear 20. At high altitudes, the cell 13 will be extended, as shown in Figs. 1 and 2, and cause the sear 20 to be engaged with the lock 26. The sear 20 remains so engaged until the pilot falls to a predetermined altitude as fixed by the adjusting screw 17. When this altitude is reached, the aneroid cell 13 will be compressed by the higher atmospheric pressure to the point where the sear 20 is disengaged from the lock 26. The lock 26, the hammer 25, and the firing pin 28 will then swing sharply upwardly because of the force exerted by the leaf spring 30. The cartridge 15 is thereby fired and forces the piston 33 and the socket 34 forwardly, pulling the rip cord 16 and opening the parachute. Thus, the parachute is automatically opened at a predetermined altitude, whether the pilot is conscious or not. Below this altitude, the aneroid cell 13 continues to contract, of course, and is well back of the lock 26 at sea level, as shown in Fig. 4. For this reason, the arming pin 42 is always maintained in position until the pilot is actually ejected from the aircraft. If the pilot is ejected below the predetermined altitude, the hammer 25 will immediately swing upwardly and fire the cartridge 15 because the lock 26 will be free of the sear 20.

The above described apparatus is very reliable when properly assembled. However, such an actuator, as known in the prior art, can be assembled with the leaf spring 30 in an inoperative position below the spring pin 29 and thus make the entire device inoperative because the hammer 25 will not swing upwardly, even when the lock 26 is released from the sear 20. Thus in assembly, with the various components in the inner housing 12 in proper relationship, the unit comprising the cylinder 36, the barrel 32, and the spring 30 is assembled in nesting relationship with the inner housing 12. This is accomplished by aligning the barrel 32 with the trough 31 and inserting the leaf spring 30 into the space defined by the housing 12 below the trough 31. The unit and the housing are then moved together and the end of the spring 30 is placed in an operative position in contact with the spring pin 29, on the upper side thereof. The outer housing 11 is then assembled by being slid over the cylinder 36 and nested over the inner housing 12. In prior parachute actuators it will be readily seen that the spring 30 can be placed in an inoperative position below the spring pin 29 as easily as in an operative position in contact with it and in the former case the hammer 25 will not swing against the cartridge to fire it. For this reason, the new actuator constructed in accordance with the invention has a projection 46 attached to the leaf spring 30, which projection extends through a slot or hole 47 in the inner housing 12 (see Fig. 5) when the spring 30 is below the spring pin 29 and, hence, is not in proper engagement therewith. In this condition, the outer housing 11 cannot be assembled with the inner housing 12, by sliding the outer housing over the right end of the inner housing, because the projection 46 limits movement of the outer housing 11. This immediately calls the condition of improper assembly to the attention of the operator or inspector. When the spring 30 is in proper position, as shown in Fig. 1, the projection 46 is drawn into the inner housing 12 so that the outer housing 11 can then be completely slid onto the inner housing 12. In the assembled position, the slot or hole 48 in the outer housing 11 is aligned with the slot 47 to provide clearance for the projection 46 when the lock 26 and the hammer 25 are released and the leaf spring 30 snaps downwardly. A well 49 is provided around the slot 48 to allow clearance for the projection 46 yet protect the interior of the actuator from dirt and dust. A cam 50 is provided in the well 49 by bending a portion of the housing 11 to enable the projection 46 to be cammed upwardly after the actuator has been fired, so that the outer housing 11 can be removed by sliding it off the right end of the inner housing 12.

It will be readily seen that the improved actuator constructed according to the invention is considerably more reliable because it cannot be improperly assembled and one possible chance of error is thereby eliminated. In its broadest form, the actuator comprises a projection affixed to resilient means for movement therewith, a housing with a slot aligned with the projection, the projection extending through the slot when the resilient means is improperly engaged with a hammer within the housing and the projection being within the housing when the resilient means is properly engaged. An outer housing, which can be slid over one end of the inner housing, also has a slot aligned with the slot in the first housing when in the assembled position. Further, the outer housing is provided with a well around the slot and into which the projection extends when the hammer is tripped.

Various modifications will be apparent from the above detailed description and can be incorporated into the invention without departing from the scope of the depending claims.

What I claim is:

1. In a parachute actuator having an outer housing, a nesting inner housing, a hammer, and resilient means in contact with an end of the hammer when properly assembled, the improvement which comprises wall means defining a first opening in said inner housing, wall means defining a second opening in said outer housing, a projection affixed to said resilient means and contained within the inner housing when the resilient means is properly positioned in contact with the end of the hammer and which projection extends outwardly from the inner housing through said first opening and prevents assembling said outer housing and said inner housing when the resilient means is improperly positioned out of contact with the end of the hammer, whereby the outer housing cannot be assembled with the inner housing unless the resilient means is in proper position in contact with the hammer and the projection is contained within the housing.

2. In a parachute actuator having an outer housing, a nesting inner housing, a hammer, and resilient means in contact with an end of the hammer when properly assembled, the improvement which comprises wall means defining a slot in the inner housing, a projection affixed to the resilient means and contained within the inner housing when the resilient means is properly positioned in contact with the end of the hammer, said projection extending through the slot in the inner housing when assembled in an improper position out of contact with the end of the hammer, and wall means defining a slot in the outer housing which is aligned with the slot in the inner housing when assembled with respect thereto.

3. In a device having an outer housing, a nesting inner housing, a hammer, and resilient means in contact with the hammer when properly assembled, the improvement which comprises wall means defining an opening in the inner housing, a projection affixed to the resilient means and contained within the inner housing when the resilient means is properly positioned in contact with the hammer, said projection extending through the slot in the inner housing when assembled in an improper position out of contact with the hammer, wall means defining an opening in the outer housing which is aligned with the opening in the inner housing when assembled with respect thereto, wall means defining a well around the opening in the outer housing, and a cam associated with said well for pushing said projection upwardly when the outer cover is removed from the inner cover, after said device has been fired.

References Cited in the file of this patent

UNITED STATES PATENTS

| | | |
|---|---|---|
| 750,743 | Whiting | Jan. 26, 1904 |
| 2,245,151 | Martinet | June 10, 1941 |
| 2,301,984 | Turnbull | Nov. 17, 1942 |
| 2,373,141 | Orloff | Apr. 10, 1945 |
| 2,432,791 | Osses | Dec. 16, 1947 |